April 30, 1929.  J. D. LANGDON  1,711,234
LIQUID MEASURING VALVE
Filed Oct. 28, 1926

Inventor:
J. D. Langdon
By Monroe E. Miller
Attorney.

Patented Apr. 30, 1929.

1,711,234

UNITED STATES PATENT OFFICE.

JESSE D. LANGDON, OF LOS ANGELES, CALIFORNIA, ASSIGNOR TO LANGDON ENGINEERING CORPORATION, OF LOS ANGELES, CALIFORNIA.

LIQUID-MEASURING VALVE.

Application filed October 28, 1926. Serial No. 144,826.

The present invention relates to valves for controlling the flow of water or other fluid, and aims to provide a novel and improved liquid measuring valve which, after being opened, will permit a predetermined flow of the liquid before shutting off such flow automatically.

Another object is the provision of such a valve device comprising a novel construction and assemblage of the component elements, in order that the device will be practical and efficient in operation.

A further object is the provision of such a device which has provisions for adjustment to regulate the amount of liquid flow for each operation.

A still further object is the provision of such a device having a novel medium for controlling the flow of the liquid and formed of rubber or similar material to constitute the main valve and operating means therefor, as well as a valve seat for a starting or relief valve.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
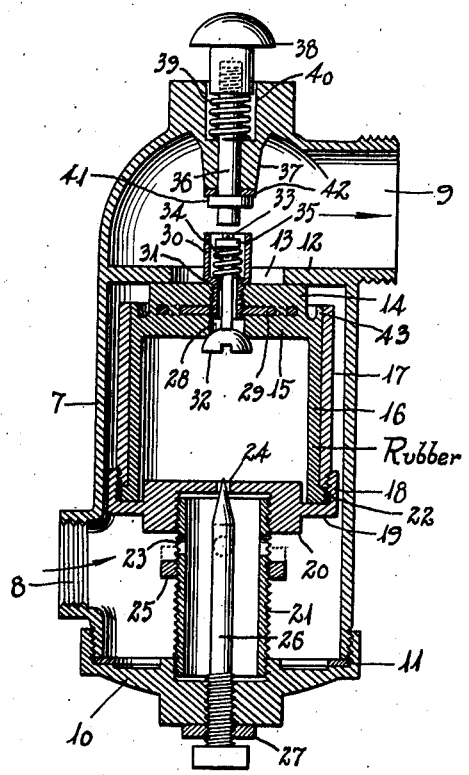
Figure 1 is a median section of the device, portions being shown in elevation, with the valve closed.

In carrying out the invention there is provided a casing 7 which is preferably cylindrical, with its axis vertical, although the device may be used in different positions. The casing 7 has a lateral inlet 8 near its lower end and a lateral outlet 9 near its upper end. The lower end of the casing constitutes a removable screw cap 10 in which a gasket 11 is disposed to prevent leakage.

The casing 7 is provided therein with a partition 12, adjacent to the outlet 9, and having a port or opening 13 therein which is normally closed by a valve portion or boss 14 projecting upwardly from the closed end 15 of an inverted cup-shaped member 16 composed of rubber or other suitable elastic or resilient material. The wall of the member 16 is cylindrical and is elastic, to be stretched longitudinally, and is disposed snugly within a metal sleeve 17. The sleeve 17 is spaced from the wall of the casing 7 to provide an annular passage for the water or liquid, and said sleeve 17 provides a guide and guard for the member 16. The lower end of the sleeve 17 is screw-threaded into the rim of a cup-shaped flange 19 outstanding from a cap 20 that is screw-threaded over the upper end of a tubular standard 21 that has its lower end screw-threaded into the cap 10, thereby supporting the cap 20 and sleeve 17 from the lower end or cap 10 of the casing. The lower edge of the member 16 has a lip or flange 22 outstanding therefrom and clamped between the flange 19 and lower end of the sleeve 17, thereby anchoring the lower end of said member 16 in place, and the upper closed end 15 of the member 16 is free to move upwardly and downwardly, the boss or portion 14 seating against the bottom of the partition 12 across the opening 13 to close the valve, as seen in Fig. 1.

The tubular standard 21 has lateral apertures 23 therein through which the water or liquid flows from the inlet 8, and the cap 20 has an aperture 24 for the upward flow of the liquid from the standard 21 into the member 16, so that the liquid being forced under pressure into said member 16 will expand said member upwardly, to seat the valve portion or boss 14 against the partition 12 across the opening 13. A nut 25 is screw-threaded on the standard 21 and may be projected more or less across the apertures 23, so as to constitute a controlling valve member to regulate the flow of liquid through the apertures 23. A finer adjustment of the flow of liquid from the inlet 8 into the member 16 is obtained by a needle valve 26 which is screw-threaded upwardly through the cap 10, within the standard 21, with its tip within the aperture 24. This needle valve may be adjusted to obtain the desired restricted flow of liquid upwardly through the aperture 24, in order to time the closing of the valve. A lock nut 27 on the needle valve 26 is adapted to bear against the cap 10 in order to maintain the adjustment of said needle valve.

In order to relieve the pressure within the member 16, and open the valve, the end 15 and portion 14 of the member 16 are provided with a central relief opening or port 28, and have embedded therein a metal plate 29 into which is screw-threaded a tubular member 30 having an offset or shoulder 31 between its ends, with a lower portion of reduced diameter entering the aperture 28 and plate 29. The offset or shoulder 31 seats on the boss or portion 14. The end 15 of the member 16, at the lower end of the opening 28, affords a seat for a relief valve 32 having an upwardly extending stem 33 projecting through the opening 28 and member 30. A nut 35 is threaded on the upper terminal of the stem 33 and a coiled spring 34 is confined between the nut 35 and shoulder 31, within the member 30, to yieldingly raise the stem 33 and seat the valve 32 upwardly against the end 15 of the member 16 across the lower end of the opening 28. Thus, the relief or starting valve 32 is normally closed by the spring 34.

In order to open the relief valve 32, a plunger 36 is slidable through a depending boss 37 with which the upper end of the casing 7 is provided, and a push button or knob 38 is screw-threaded on the upper terminal of the plunger 36. The plunger 36 is normally raised by a coiled spring 39 confined between the button 38 and the boss 37, the upper end of the casing 7 preferably having a recess 40 housing the spring 39. The plunger 36 has a collar 41 near its lower end below the boss 37, and a cushion washer 42 is disposed on the plunger 36 between the collar 41 and boss 37 against which the collar 41 seats when the plunger 36 is raised by the spring 39. The plunger 36 is disposed immediately above the stem 33 of the relief valve 32, in order that when the button 38 is pressed down, the lower end of the plunger 36 will enter the member 30 and push the stem 33 down, thereby unseating the valve 32.

Figure 2:
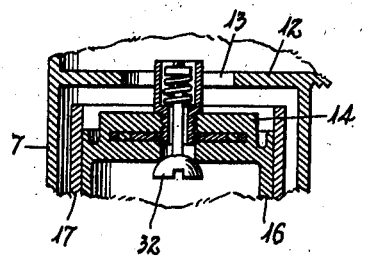
Fig. 2 is a sectional detail showing the valve open.

In operation, with the valve 32 closed, and the liquid under pressure within the member 16 from a source of liquid under pressure with which the inlet 8 communicates, the member 16 is expanded or stretched lengthwise to hold the portion or boss 14 seated against the partition or seat 12 across the opening 13. This shuts off the flow of liquid from the inlet 8 to the outlet 9. By pressing down on the button 38, the relief valve 32 is opened, thereby relieving the pressure within the member 16, inasmuch as the liquid within said member may flow through the opening 28 to and through the outlet 9, and as a result of the relieving of pressure within the member 16, said member will contract lengthwise, to retract the boss or portion 14 thereof from the opening 13, as seen in Fig. 2. This opens the valve and permits the flow of liquid from the inlet 8 to the outlet 9 through the opening 13. The liquid flows from the inlet upwardly between the sleeve 17 and wall of the casing 7 and thence over the member 16 and upwardly through the opening 13. When the relief valve 32 is opened, the contraction of the member 16 will quickly release the liquid from within said member through the opening 28, so that the valve is opened quickly, and as soon as the button 38 is released, the valve 32 is closed by its spring 34. Consequently, as the liquid flows through the opening 13, the pressure will force a small stream of liquid through the apertures 23 and 24 into the member 16, thereby building up the pressure within said member, and expanding said member until the valve portion or boss 14 is again brought against the partition 12 to close the opening 13. The length of time that the valve is kept open, for purpose of regulating the amount of flow of liquid, is determined by adjusting the cap 20 upwardly and downwardly on the standard 21, to raise and lower the member 16 as a whole relatively to the partition or seat 12, and by the adjustment of the needle valve 26 to regulate the flow of the liquid through the aperture 24. As the valve portion 14 approaches the partition 12 this will increase the pressure of the liquid below the partition 12, thereby accelerating the pressure within the member 16 to close the valve quickly in its final movement. By adjusting the cap 20 upwardly, the upper end of the sleeve 17 and member 16 are adjusted closer to the partition 12, thereby restricting the flow of liquid to the opening 13 from the inlet 8, and increasing the pressure within the member 16 when the valve is opened, so as to obtain a more rapid closing of the valve. Thus, the pressure of the liquid entering the member 16 through the apertures 23 and 24 may be controlled, and the timing of the valve may be regulated by the adjustment of the nut or valve 25 and needle valve 26. By making proper adjustments it is possible to regulate the time of flow and the quantity of liquid delivered.

By unscrewing the cap 10, the standard 21, cap 20, sleeve 17, member 16 and relief valve are removed as a unit from the casing, and the various parts may be readily separated and assembled, as will be apparent. The member 16 may be readily molded from rubber or other suitable resilient material, and not only serves as the main valve, but also as a seat for the relief valve 32, as a spring means for retracting the valve portion 14 when the relief valve is opened, and as a piston working within the sleeve or cylinder 17 to close the valve by pressure brought to bear within the member 16. The member 16 thus serves several functions, and consists of a unitary element with the plate 29 embedded or molded therein. The portion 14 of said member serves as the main valve to close the opening 13, the cylindrical wall of said member serves as a spring to retract the portion 14 when the relief valve is opened and also serves to prevent leakage between the member 16 and sleeve 17, and the end 15 of said member serves as a piston head working in the sleeve or cylinder 17. The member 16 has an upwardly extending lip 43 at its upper end surrounding the boss or portion 14 which is forced by the liquid pressure tightly against the sleeve or cylinder 17, to prevent the liquid working down between the sleeve 17 and wall of the member 16, which if it occurred, would force the wall of the member 16 inwardly and thereby interfere with the normal intended operation of said member. The lip 43 being pressed outwardly against the inner surface of the sleeve or cylinder 17 will therefore prevent the liquid passing down between said lip and the sleeve.

The members 16 may be composed of other material than rubber, and its wall may be of suitable flexible material which need not be elastic, in which event said member will be of sufficient length to permit the valve portion 14 to bear against the partition or seat 12, and when the relief valve is opened, the pressure within the member 16 being relieved, will result in the opening of the valve portion 14 by the pressure on the top thereof which is greater than the pressure within the member 16. Thus, the contraction of the wall of the member 16 is not necessary in order to unseat the valve portion 14 when the relief valve 32 is opened. The valve portion 14 being retracted within the end portion of the cylinder or cage 17, as seen in Fig. 2, will also prevent said valve portion being drawn to closed position by the suction created as the liquid flows through the opening 13, until the pressure is built up within said member 16.

The cylinder 17 may be a cage of any suitable shape in which the member 16 is confined for movement toward and away from the partition or valve seat 12, and the term "cylinder" is used in a broad sense.

The upper portion of the tubular member 30 provides a shield for the upper terminal of the valve stem 33, to prevent the water which flows through the opening 13 from tilting the stem 33 and opening the valve 32 during the closing of the valve portion 14. The valve 32 and its stem 33 are disposed loosely with reference to the opening 28 and tubular member 30, so as not to stick or bind, and without the protection of the tubular member 30 the stem 33 is apt to be tilted by the water rushing past the valve portion 14 through the opening 13 during the closing action of the member 16, which, if it occurred, would release the liquid from within the member 16, so that said member would again open, thereby preventing the closing of the valve device.

Having thus described the invention, what is claimed as new is:—

1. A valve device of the character described comprising a casing having an inlet and an outlet and having a valve seat between said inlet and outlet, a cylinder mounted in said casing, a cup-shaped flexible member in said cylinder and having a valve portion at its closed end movable to and from said valve seat, said flexible member having a lip surrounding said valve portion to bear against the cylinder under liquid pressure, means for admitting a restricted flow of liquid from the inlet into said member to expand said member and seat said valve portion, and means for releasing the liquid from said member.

2. A valve device of the character described comprising a casing having an inlet and an outlet and having a valve seat between said inlet and outlet, a tubular standard within the casing supported thereby, a cap mounted on said standard and having an aperture, said standard having an opening communicating with said inlet, a cylinder having one end connected to said cap, a cup-shaped flexible member disposed within said cylinder and having a valve portion at its closed end movable to and from said valve seat, the opposite end of said resilient member being anchored between said cylinder and cap, a needle valve projecting into said standard to control flow through said aperture into said flexible member, said flexible member having a relief opening through said valve portion, a relief valve for said opening, and means for opening said relief valve.

3. A valve device of the character described comprising a casing having an inlet and an outlet and having a valve seat between said inlet and outlet, a cylinder mounted within said casing, a cup-shaped flexible member within said cylinder and having a valve portion at its closed end movable to and from said valve seat, means for admitting a restricted flow of liquid from the inlet into said member to expand said member and seat said valve portion, and means for releasing the liquid from said member, said member having a yieldable portion surrounding said valve portion to be expanded against said cylinder under liquid pressure to prevent the liquid passing between said cylinder and member.

4. For use in a valve device of the character described, a cup-shaped flexible member to be disposed within a cylinder and having a valve portion at its closed end to move to and from a valve seat, said member having a yieldable portion surrounding said valve portion to be expanded against the cylinder by fluid pressure.

5. For use in a valve device of the character described, a cup-shaped flexible member having a valve portion at its closed end to move to and from a valve seat, said end of said member having a relief opening therethrough, a plate embedded within said end of said member, a tubular member secured to said plate in said opening, a relief valve seatable across one end of said opening and having a stem projecting into said tubular member, and a spring between said stem and tubular member to seat said relief valve.

6. For use in a valve device of the character described, a cup-shaped flexible member to be disposed within a cylinder and having a valve portion at its closed end to move to and from a valve seat, said member having a lip surrounding said valve portion to bear against the cylinder under fluid pressure.

7. A valve device of the character described comprising a casing having an inlet and an outlet and having a valve seat between said inlet and outlet, a tubular support in said casing, a cage having a cap mounted on said support for adjustment toward and away from said valve seat, a member movable in said cage and having a valve portion to bear against said seat, said cap having an aperture for admitting a restricted flow of liquid from the inlet into said cage to seat said member, and means for releasing the liquid from said cage.

8. For use in a valve device, a cup-shaped member the closed end of which forms a piston to work in a cylinder, said closed end being provided with a valve portion to move to and from a valve seat, the wall of said member being elastic, and said member having an annular lip at its closed end extending away from the open end of said member and adapted to bear against said cylinder.

9. A valve device comprising a casing having a valve seat therein, a cylinder in said casing, a cup-shaped member within said cylinder, the rim of said member being secured within said casing, the closed end of said member forming a piston slidable snugly in the cylinder and having a valve portion to bear against said seat, the wall of said member being elastic, the closed end of said member being subject to opposing fluid pressures at its inner and outer surfaces, and means controlling the flow of fluid pressure to control said member.

10. A valve device comprising a casing having a valve seat therein, a cylinder in said casing, a cup-shaped member within said cylinder, the rim of said member being secured within said casing, the closed end of said member forming a piston slidable snugly in the cylinder and having a valve portion to bear against said seat, the wall of said member being elastic, said member having an annular lip at its closed end extending away from the rim of said member and bearing against said cylinder, the closed end of said member being subject to opposing fluid pressures at its inner and outer surfaces, and means controlling the flow of fluid pressure to control said member.

In testimony whereof I hereunto affix my signature.

JESSE D. LANGDON.